United States Patent [19]

Deprez

[11] 4,198,184
[45] Apr. 15, 1980

[54] ENDLESS CHAIN APPARATUS FOR FORMING SPUR AND HELICAL GEARS

[75] Inventor: Thomas A. Deprez, Rochester, N.Y.

[73] Assignee: The Gleason Works, Rochester, N.Y.

[21] Appl. No.: 930,252

[22] Filed: Aug. 2, 1978

[51] Int. Cl.$^2$ .......................................... B23D 37/18
[52] U.S. Cl. ........................................ 409/262; 409/5; 409/59; 51/136; 74/242.8; 198/813
[58] Field of Search .................. 90/10, 9, 3, 78, 22, 90/82, 95; 51/136; 74/242.8; 198/813, 838

[56] References Cited

U.S. PATENT DOCUMENTS

| | | | |
|---|---|---|---|
| 1,409,766 | 3/1922 | Perkins et al. | 409/59 |
| 1,468,393 | 9/1923 | Perkins et al. | 409/61 |
| 1,469,602 | 10/1923 | Perkins et al. | 409/10 |
| 1,503,996 | 8/1924 | Perkins et al. | 409/38 |
| 1,712,256 | 5/1925 | Coltian | 409/6 |
| 1,737,217 | 11/1929 | Coltian | 409/41 |
| 1,932,425 | 10/1933 | Stainfield | 90/78 X |
| 2,080,464 | 5/1937 | Doan | 90/78 X |
| 2,475,690 | 7/1949 | Bonnaffe | 409/10 |
| 2,692,537 | 10/1954 | Gleason et al. | 409/10 |
| 2,749,804 | 6/1956 | Daout | 409/10 |
| 2,838,980 | 6/1958 | Babcock | 90/78 X |
| 2,905,007 | 9/1959 | Carlsen | 409/166 |
| 3,587,385 | 6/1971 | Orend | 409/232 |
| 3,757,924 | 9/1973 | Yakubek | 198/813 X |

FOREIGN PATENT DOCUMENTS

| | | |
|---|---|---|
| 345611 | 6/1918 | Fed. Rep. of Germany. |
| 2413023 | 9/1976 | Fed. Rep. of Germany. |
| 380404 | 7/1973 | U.S.S.R. .................. 90/78 |

Primary Examiner—Gil Weidenfeld
Attorney, Agent, or Firm—Morton A. Polster; Ralph E. Harper

[57] ABSTRACT

A gear cutting machine is provided with an endless chain for carrying a plurality of tools into contact with one or more workpieces to thereby form gear tooth configurations on the workpieces. The endless chain is provided with tightening means for stiffening articulated links of the chain as it passs through a zone in which its tools make contact with a workpiece, thereby providing a rigid series of links in the work zone.

3 Claims, 6 Drawing Figures

ENDLESS CHAIN APPARATUS FOR FORMING SPUR AND HELICAL GEARS

BACKGROUND AND BRIEF DESCRIPTION OF INVENTION

It is known in the art of broaching to provide for machines which utilize an endless chain for carrying a series of tools into contact with one or more workpieces. Additionally, it is known to utilize machines of this type for producing spur and helical gears. Examples of early machine designs for producing gears with tools carried on articulated links making up an endless chain are disclosed in U.S. Pat. Nos. 1,468,393; 1,469,602; 2,475,690; 2,692,537; and 2,749,804.

Machines utilizing an endless chain for carrying a plurality of tools offer a potential for very high speed production of whatever shape of workpiece is being formed by the tools. In fact, in the case of gear production, it is contemplated that stacks of gear blanks may be worked simultaneously with machinery of this type, rather than one at a time as has been the case with many other types of gear forming machines. However, the requirements for gear manufacture are far more severe than those for other forms of broaching, and therefore, machines of this type have not been, as far as is known, commercially acceptable for high production gear manufacturing needs. The forming of gear tooth profiles on a work blank requires precise control of an engagement between a workpiece and each cutting tool, and this requirement demands, in turn, a very rigid machine which maintains precise placement of workpiece and tool under a working load and for a sustained operation of the machine. Since an endless chain is by its very nature not as rigid as other forms a tool-holding equipment, it has been a problem in this art to design and manufacture an endless chain type of machine having the capability of high production manufacture of precision gears.

One of the features of the present invention is to provide for a means for effectively tightening and stretching a portion of an endless chain in the zone in which its tools make contact with one or more workpieces. Prior efforts in this regard (as shown in U.S. Pat. No. 2,475,690 and 2,749,804, for example) have suggested the placement of a gear for driving the endless chain in a position immediately behind the chain and at a point where the chain is engaging a workpiece. The apparent reason for such placement was to provide a firm drive for the chain in its zone of heaviest load during a cutting operation so as to establish, as much as possible, a precise and known relationship between the cutting tools of the chain and the workpiece.

In contrast to the prior art suggestion of backing the chain with a drive gear at its zone of contact with a workpiece, the present invention provides for a pair of spaced apart driven members in positions which are upstream and downstream from the zone of contact of the endless chain with the workpiece. One of the driven members is driven so as to advance the endless chain, while the other is effectively driven by the endless chain. In this sense the "driven members" are each driven in a different way, and they could just as well be called "idlers" or "gears", however, for purposes of this discussion reference will be made throughout to "driven members". The driven members are designed so that they can be adjusted and fixed relative to each other in a way which tends to "stretch" and remove backlash from articulated links of the portion of the chain being driven by and between the spaced driven members. This action effectively tightens the chain between the two driven members to thereby remove any looseness in its links and points of articulation and to make it more rigid. The tightened chain is less likely to chatter or deflect in the cutting zone, and this permits a better control of tooth profile in the manufacture of precision gears. The spacing of the driven members is sufficient to include several articulated links of the endless chain so that an entire section of chain, for its entire width, can be made effectively rigid to accommodate a stack of gears in the cutting zone and to provide a rigid face across which one or more gears can be translated during a cutting operation. Thus, the invention has an effect of making a relatively large portion of an endless chain sufficiently rigid to permit precision production of multiple numbers of workpieces or to accommodate greater relative movement between even a single workpiece and the cutting tools of such a machine, than has been attained in the past.

In addition, the adjustable driven members of this invention function to remove backlash from the relatively small gears making up the drive train for the endless chain. This is important because it permits the use of smaller drive gears, within the confines of the chain itself, than would otherwise be possible.

In accordance with a preferred embodiment of the invention, the tightening means for stiffening the endless chain includes a pair of spaced drive members which can be rotated and fixed relative to each other in a driving relationship with the endless chain so that articulated links of the endless chain are effectively stretched and tightened in a flat plane defined between the driven members. A common driving means serves to move both of the driven members is synchronism with each other.

Since the spaced driven members which are used for tightening the endless chain do not function, in the same sense as certain prior art arrangements, to support the endless chain in its cutting zone, a series of rollers are provided in the cutting zone for firmly backing the endless chain as it engages one or more workpieces. These rollers and their specific functions will be described herein in combination with the tightening means of this invention and are more fully described in my copending patent application Ser. No. 930,779, Aug. 2, 1978, filed even date herewith under title of "ENDLESS CHAIN APPARATUS FOR FORMING SPUR AND HELICAL GEARS WITH MEANS FOR CONTROLLING CHAIN".

These and other features and advantages of the present invention will be discussed in further detail below. In that discussion reference will be made to the accompanying drawings as briefly described below.

DETAILED DESCRIPTION OF INVENTION

Figure 1:
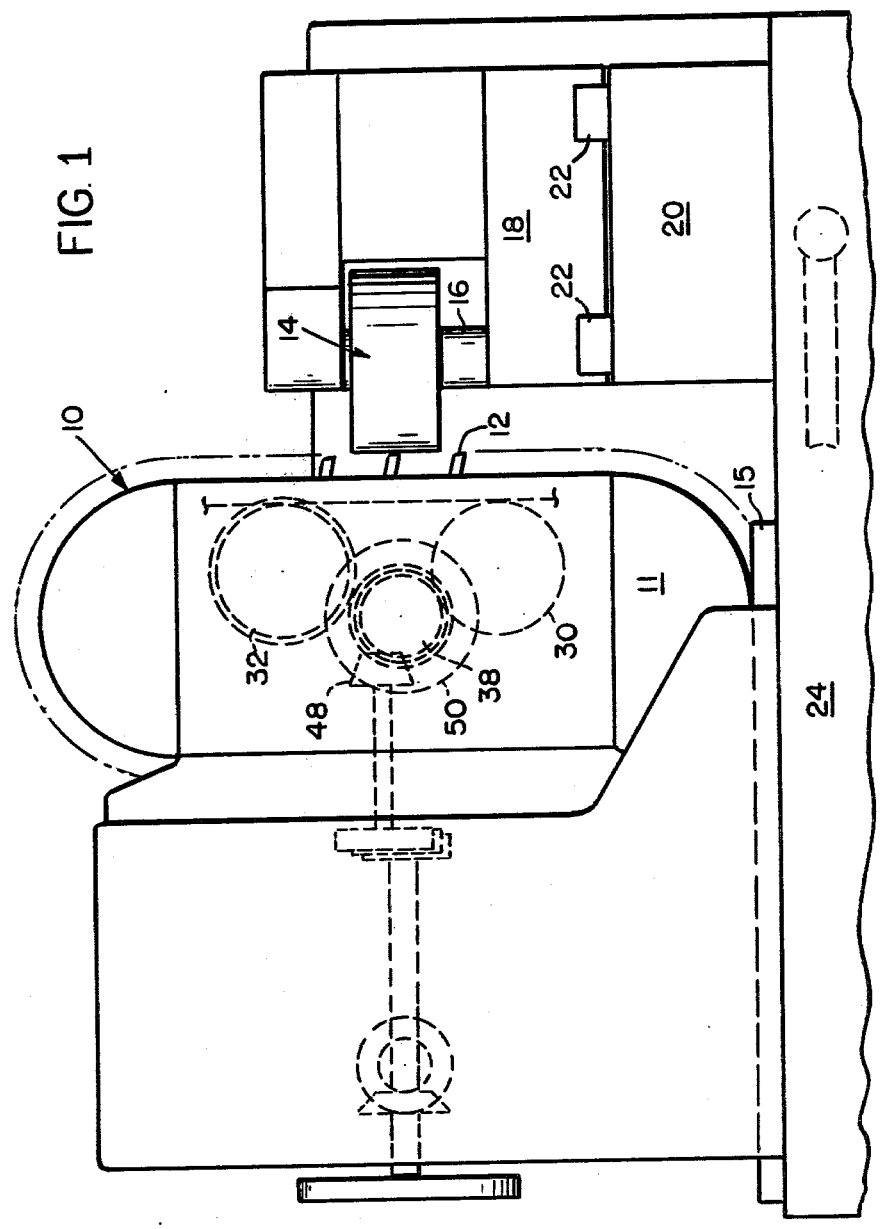
FIG. 1 is an elevational view of a machine of the general type contemplated by the present invention.
Figure 2:
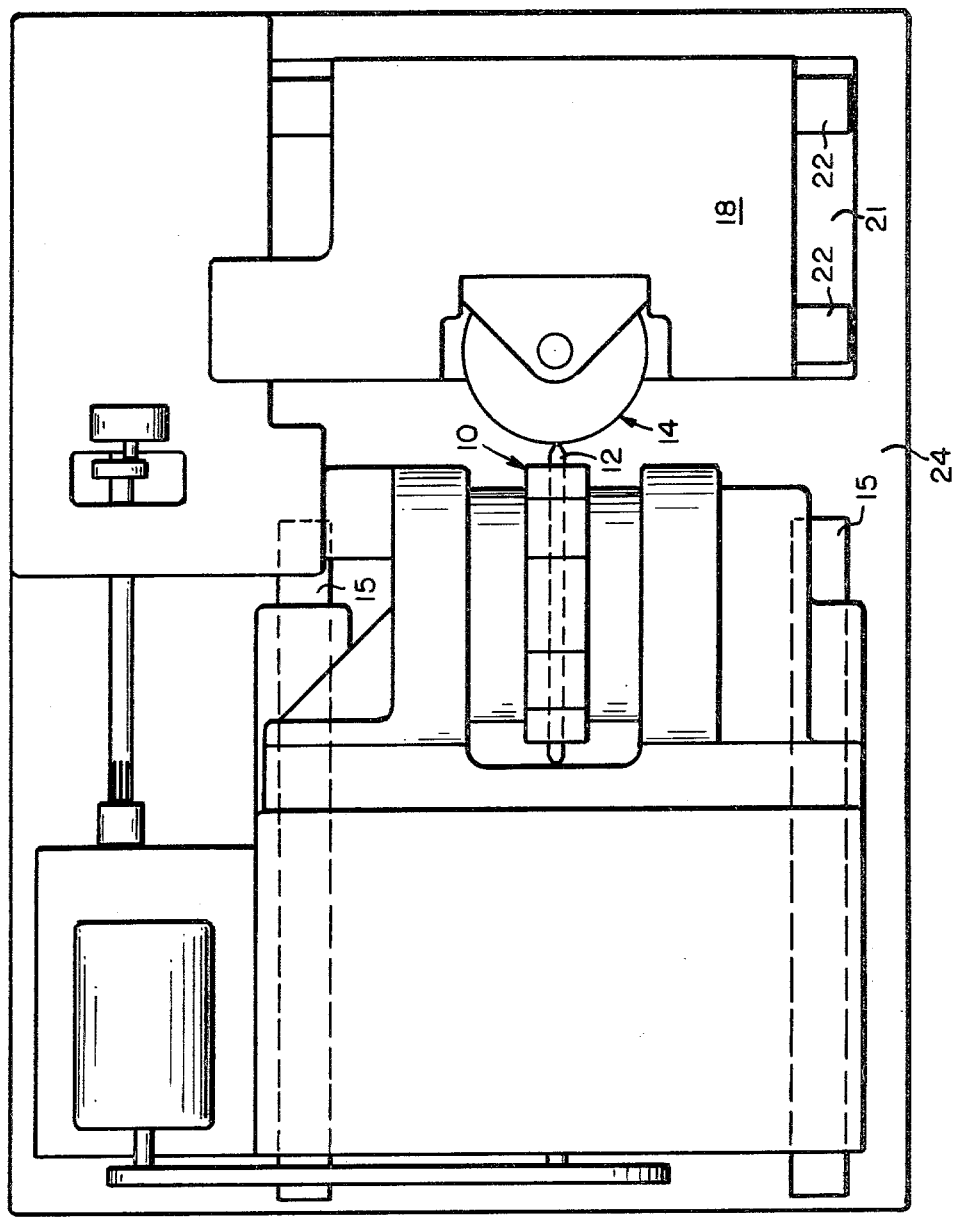
FIG. 2 is a top plan view of the machine shown in FIG. 1.

FIGS. 1 and 2 illustrate the type of gear manufacturing machine contemplated by the present invention in which an endless chain 10 is made up of a series of articulated links for carrying stock removing tools 12. The stock removing tools 12 may be in the form of cutting or grinding tools and may be arranged in one or more rows around the entire circumference of the endless chain 10. FIG. 1 shows the endless chain mounted in a vertical orientation around a housing 11 for being advanced toward and away from one or more workpieces 14 (workpieces may be manufactured one at a time or may be stacked and manufactured in multiple numbers) on ways 15, but other orientations of the endless chain are possible. At the work station end of the machine, the workpieces 14 are removably mounted on a spindle 16 mounted in a housing 18. The housing 18 is carried on a base portion 20 and may be mounted on ways 22 for providing a relative translating motion between the workpiece 14 and the endless chain 10. All working components are carried above a common base 24. Details of the machine itself may vary widely in accordance with known design features for such machines. For example, loading and unloading devices may be provided for moving workpieces into and out of the work station area, and it would be possible to provide for translation of the endless chain itself relative to a fixed position of the workpieces, if desired. In addition, known means are provided for tilting the housing 11 and its endless chain 10 for setting a helix angle for the manufacture of helical gears.

Figure 3:
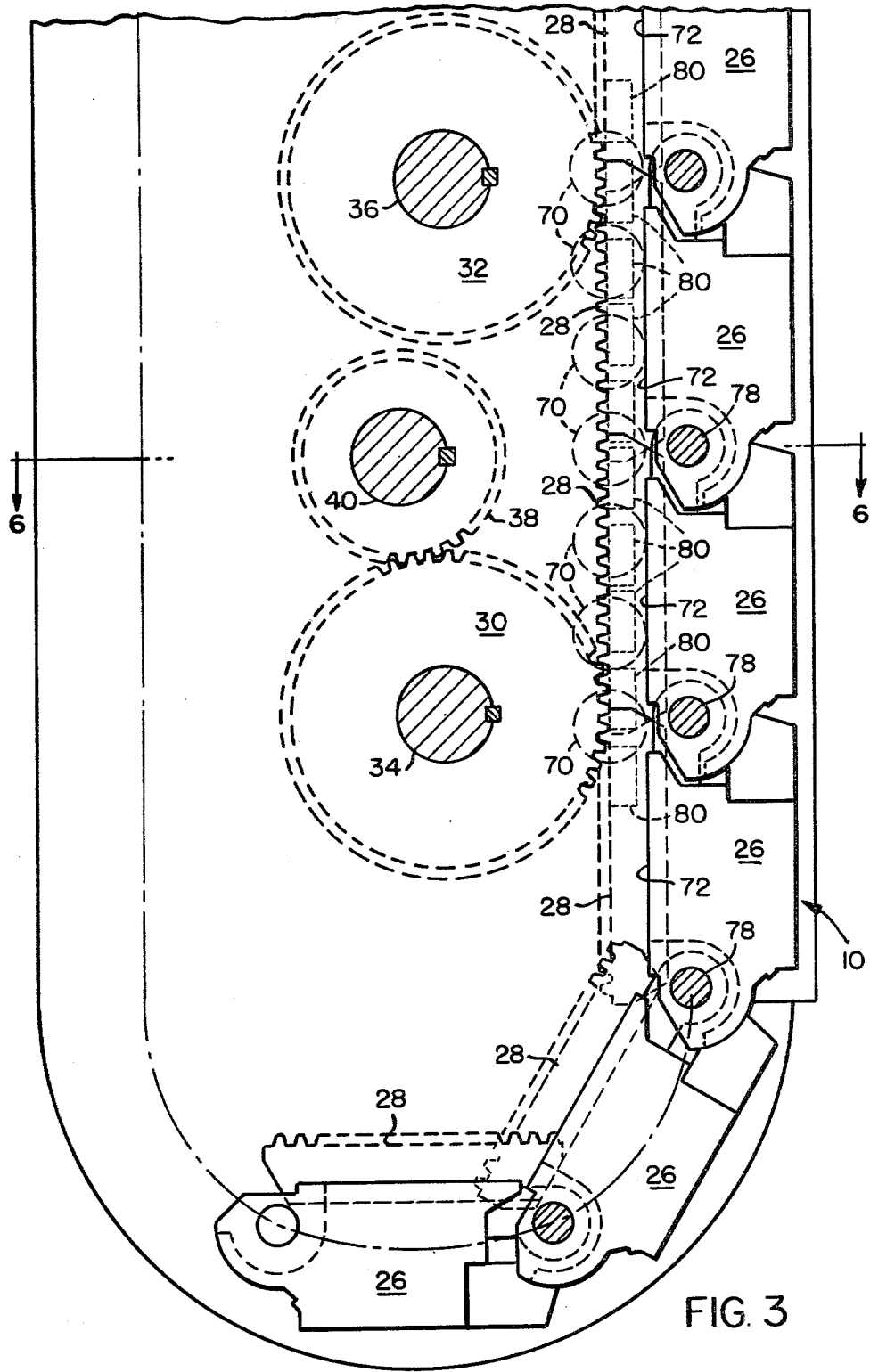
FIG. 3 is an enlarged view of a portion of an endless chain associated with the machine of the present invention, showing means for driving and tightening the chain.

FIG. 3 is an enlarged elevational view of portions of the endless chain 10. The endless chain 10 is made up of a series of articulated links 26 (a number of which have been omitted from the FIG. 3 view but which would include a sufficient number to form a complete endless chain made up of such links), and it can be seen that the links 26 are arranged to be driven in a straight path in the zone in which tools carried by the links engage one or more workpieces carried by a workpiece support of the machine. The work zone may be considered to be the straight path portion shown to the right side of the FIG. 3 view. Cutting tools have been omitted from this drawing for purposes of clarity.

It can be seen that each link member 26 includes as inner rack portion 28 secured to the main body of the link for meshing engagement with a pair of spaced apart driven members 30 and 32. The driven members 30 and 32 comprise gears having equal diameters and numbers of teeth for engaging the tooth profiles on the racks 28 of each articulated link. Thus it can be seen that the gear 30 is mounted in a driving contact with the endless chain, and the gear 32 is mounted in a spaced position therefrom to define a flat plane in the cutting direction of movement of the endless chain. As will be discussed in greater detail below, one of the gears 30 or 32 is arranged to be rotated and fixed relative to the position of the other of the gears to thereby effectively stretch and tighten the endless chain 10 in the flat plane defined between the positions of the two gears 30 and 32.

Figure 4:
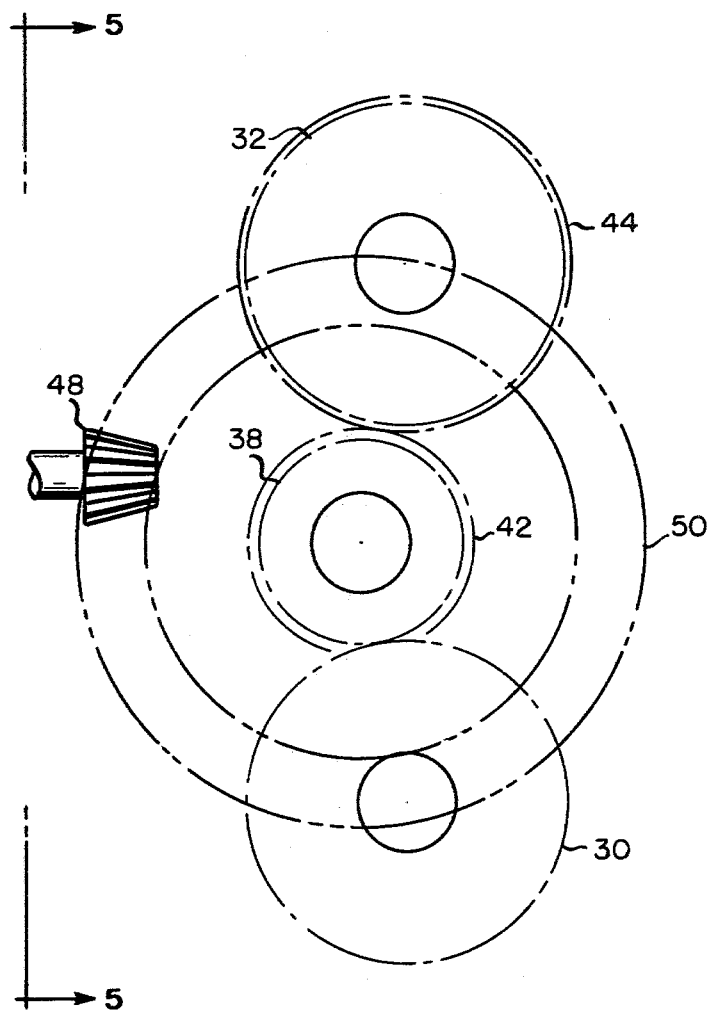
FIG. 4 is a view of a gear train for driving and tightening the endless chain, as seen in the same orientation as that of FIG. 3.
Figure 5:
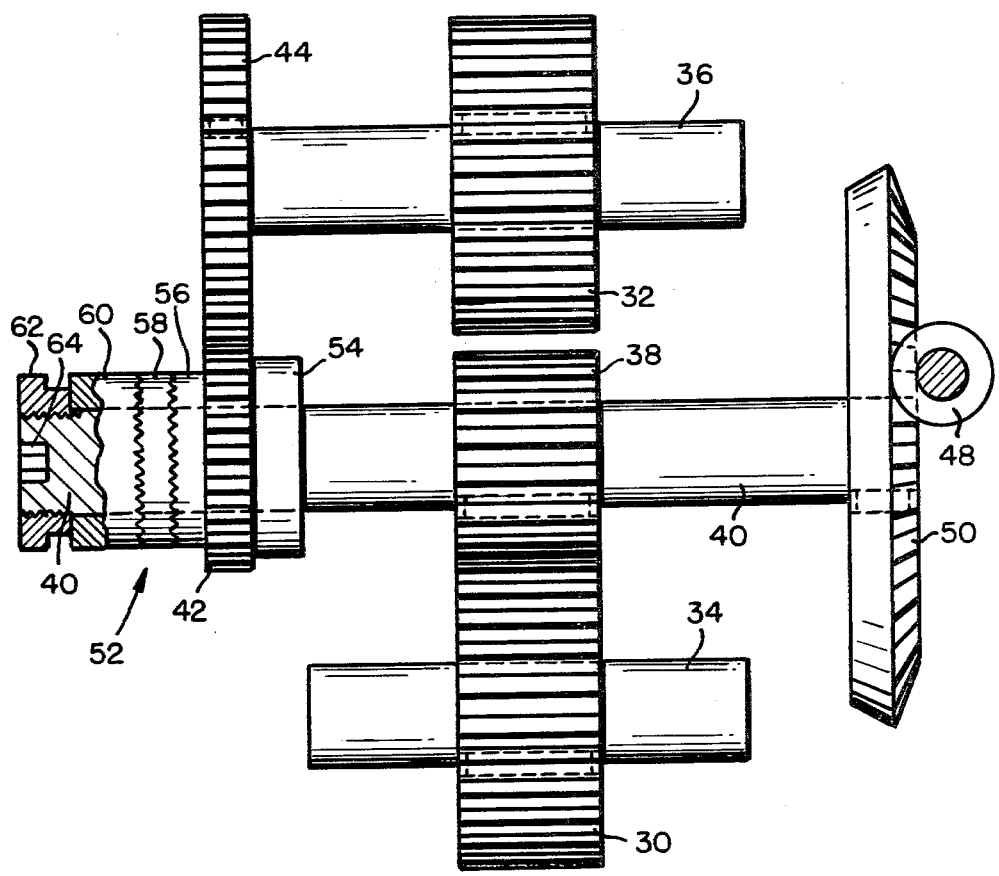
FIG. 5 is a view of the FIG. 4 gear train, as seen on line 5—5 thereof.

Referring also to FIGS. 4 and 5, it can be seen that each of the gears 30 and 32 is mounted and fixed to its own separate shaft (shafts 34 and 46, respectfully) while a third gear 38 is mounted and fixed on a main drive shaft 40 for driving the gear 30. The gears 30 and 32 are arranged so that the third gear 38 meshes with and drives only the gear 30. A fourth gear 42 is releasably secured to an end of the main drive shaft 40 and is in meshing engagement with a fifth gear 44 fixed to an end of the shaft 36. Thus, rotation of the drive shaft 40 results in a corresponding rotation of the gear 42 which, in turn, permits counter-rotation of the shaft 36 and its gear 32 through the meshing engagement of gear 42 with gear 44. In operation, it is intended that the gears 38 and 30 are meshing on the drive sides of their engaged gear teeth, while the gears 42, 44, and 32 are operating on the coast sides of their engaged gear teeth. In this way, driving rotations can be transmitted from a pinion 48 and ring gear 50 to the common drive shaft 40 and to the gear 30 and the endless chain 10 so as to produce a synchronized rotation of the pair of gears 30 and 32 in their meshing engagement with the endless chain 10.

FIG. 5 illustrates a coupling assembly 52 which is used for locking and unlocking the fourth gear 42 and for providing adjustment between the pair of gears 30 and 32. The coupling assembly includes a shoulder 54 fixed to the main drive shaft 40 for clamping one side of the gear 42. The gear 42 is not keyed to the main drive shaft 40 and is free to rotate until it is clamped into a fixed position between the shoulder 54 and an opposing face clutch member 56. Face clutch member 56 is secured to or formed integrally with the gear 42. An intermediate face clutch member 58 rides freely on the shaft 40, and a final face clutch member 60 is keyed or otherwise secured to an extension of the drive shaft 40. The clutch members 56, 58, and 60 may have a different number of face tooth elements and are clamped and unclamped relative to each other through a threaded clamping ring 62. When it is desired to adjust relative positions of the pair of gears 30 and 32, the clamping ring 62 is unscrewed from its clamping position on the end of the main drive shaft 40, and this releases the clutch elements 56, 58, and 60 from tight engagement. Then, a tool can be inserted into the recessed opening 64, and the drive shaft 40 can be rotated by a precise increment to cause gear 30 to rotate in a direction which tightens and stretches the chain links contained between the gear 30 and the gear 32. During this procedure, the gear 42 is held in a fixed position. Once the adjustment has been made, the clutch elements 56, 58 and 60 are reclamped against the gear 42 through a tightening of the threaded ring 62 to lock the gear 42 is an adjusted position relative to the main drive shaft 40. Then the gear 42 is released from its secured position, and the chain is set in a tightened condition for being driven by the pinion 48 and gear 50.

Figure 6:
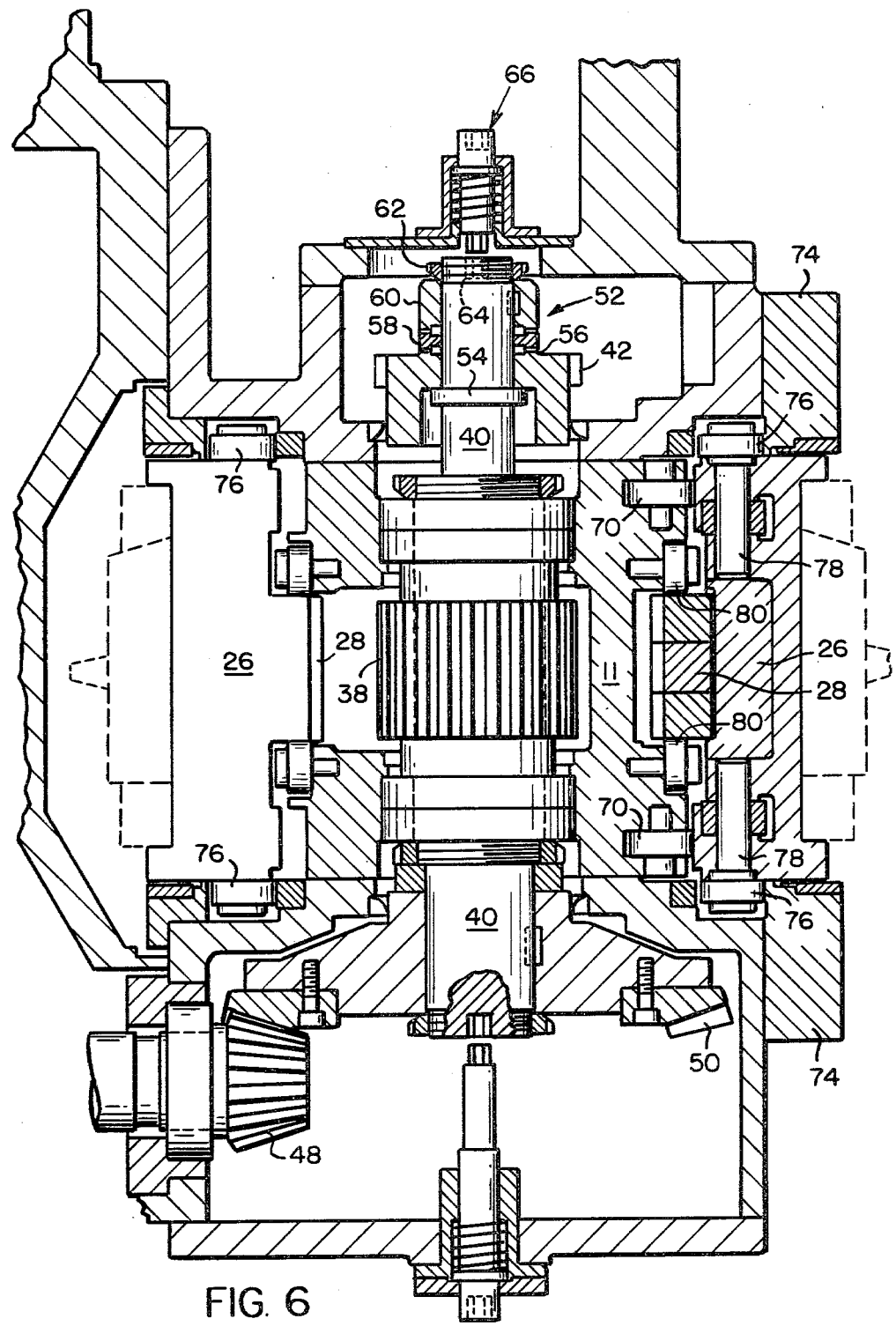
FIG. 6 is a cross sectional view of a portion of the chain and drive means shown in FIG. 3, as seen on line 6—6 thereof.

FIG. 6 shows a less schematic illustration than that of FIG. 5 of the coupling assembly 52. In this arrangement, the element 56 has been incorporated into a shoulder portion of the gear 42 and is, therefore, not shown as a separate element. Also, it can be seen that a special provision has been made for reaching the recessed opening 64 from outside of the confines of the machine housing through a spring loaded driving device 66 which can be pushed into engagement with the recessed opening 64 for effecting a rotation of the entire endless chain.

FIG. 6 also illustrates details of an actual embodiment of an endless chain provided with the driving features of the present invention. Since the pair of gears 30 and 32 do not provide support for the endless chain in the actual cutting zone of the chain, a series of rollers 70 are positioned within a portion of the housing 11 for firmly backing the endless chain 10 in the cutting zone region. As shown in FIG. 3, bearing surfaces 72 are provided on the back sides of the individual links 26 for riding on the series of rollers 70. The individual links 26 are pressed into firm contact with the rollers 70 through the use of gibs 74 (FIG. 6) which are arranged along each side of the chain path so as to engage and press down on rollers 76 carried at the ends of individual pins 78 which serve to connect separate links 26 together. The rollers 76 also function to ride in guideways formed in the housing 11 after they leave the working zone areas where the links 26 are released from the support of the backing rollers 70.

A seperate series of rollers 80 are positioned in the housing 11 on opposite sides of the rack portion 28 of the individual links making up the endless chain 10, and these rollers serve to confine the chain in the working zone area to prevent any unwanted side-to-side motions of the chain in the critical work area.

Although the invention has been described and discussed with reference to a specific embodiment only, it can be appreciated that certain variations and equivalent structures can be substituted for those discussed above. All such equivalent designs are intended to be included within the scope of protection sought herein as described in the claims below.

What is claimed is:

1. In apparatus of the type which includes an endless chain provided with stock removing tools arranged in at least one row for contacting a workpiece and for removing stock therefrom, the improvement in means for driving and controlling the endless chain characterized by tightening means for stiffening the endless chain as its passes through a work zone in which its tools make contact with a workpiece, said tightening means including a pair of gears mounted in meshing contact with the endless chain in spaced apart positions which define a flat plane in the cutting direction of movement of the endless chain, each of the gears of said pair of gears being mounted and fixed to a separate shaft, and including a third gear mounted on a main drive shaft for imparting driving moments to said pair of gears and endless chain, a fourth gear carried on said main drive shaft, a fifth gear carried on one of the shafts for one of said pair of gears, said gears being arranged so that said third gear meshes with and drives one of said pair of gears while said fourth gear carried on said main drive shaft is simultaneously rotated therewith, said fourth gear being arranged to mesh with said fifth gear fixed to the shaft associated with the other of said pair of gears, and wherein said fourth gear is releasably secured in its connection to said main drive shaft, so that the gear train can be adjusted and the articulated links of the endless chain can be stretched and tightened in the flat plane defined between the driven members, and driving means for moving said driven members in synchronism with each other.

2. The improvement of claim 1, and including a coupling assembly carried at one end of said main drive shaft for locking and unlocking said fourth gear relative to the main drive shaft, said coupling assembly comprising face clutch members which can be disengaged to permit precise adjustment of one of said pair of gears relative to said fourth gear, and including a clamping ring for locking said clutch members and said fourth gear after an adjustment is made.

3. The improvement of claim 2 and including a tool-receiving opening in one end of said main drive shaft so that the main drive shaft and said third gear can be rotated when said coupling assembly is unlocked, to thereby provide for a tightening of the endless chain and a removal of backlash in the drive train for the endless chain.

* * * * *